US012578141B2

(12) United States Patent
Cardona

(10) Patent No.: US 12,578,141 B2
(45) Date of Patent: Mar. 17, 2026

(54) HEATED PAINT DRYING SYSTEM

(71) Applicant: Mike Cardona, Corpus Christi, TX (US)

(72) Inventor: Mike Cardona, Corpus Christi, TX (US)

( * ) Notice: Subject to any disclaimer, the term of this patent is extended or adjusted under 35 U.S.C. 154(b) by 553 days.

(21) Appl. No.: 18/142,062

(22) Filed: May 2, 2023

(65) Prior Publication Data

US 2024/0369299 A1 Nov. 7, 2024

(51) Int. Cl.
*F26B 21/00* (2006.01)

(52) U.S. Cl.
CPC .......... *F26B 21/002* (2013.01); *F26B 21/004* (2013.01); *F26B 2210/12* (2013.01)

(58) Field of Classification Search
CPC .. F26B 21/002; F26B 21/004; F26B 2210/12; F26B 23/06; F26B 3/283; F26B 21/00
See application file for complete search history.

(56) References Cited

U.S. PATENT DOCUMENTS 4,943,447 A 7/1990 Nelson
5,113,600 A 5/1992 Telchuk
5,331,747 A * 7/1994 Stanton .................... F26B 5/04 34/104
5,568,691 A * 10/1996 Rubin .................... A45D 20/30 392/380
5,836,085 A 11/1998 Ben-Ezra
6,968,633 B2 11/2005 Morrison
9,756,922 B1 * 9/2017 Duthe .................... A45D 20/12
2009/0130317 A1 5/2009 Moore
2015/0128483 A1 * 5/2015 Krupp .................... F24F 3/14 126/110 A
2015/0289623 A1 * 10/2015 Matsui .................... H01T 23/00 34/97

FOREIGN PATENT DOCUMENTS

WO WO2004098788 11/2004

* cited by examiner

*Primary Examiner* — David J Laux

(57) ABSTRACT

A heated paint drying system for drying paint on a vehicle using heated pressurized air includes an air supply supplying pressurized air. An air hose is coupled to the air supply and transfers pressurized air from the air supply. A housing includes a handle section, a head section, and a channel extending through the housing from the head section to the handle section. The air hose is in fluid communication with the channel when the air hose is coupled to the housing. A valve is positioned within the channel and a trigger selectively opens or closes the valve. A heat emitter is attached to the housing and heats pressurized air passing through the channel. An electricity generator is electrically connected to the heat emitter. The electricity generator has a driver manipulated by the flow of pressurized air, wherein the heat emitter is turned on when the driver is manipulated.

10 Claims, 5 Drawing Sheets

HEATED PAINT DRYING SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to paint drying systems and more particularly pertains to a new paint drying system for drying paint on a vehicle using heated pressurized air.

(2) Description of Related Art Including Information Disclosed Under 37 CFR 1.97 and 1.98

The prior art relates to paint drying systems and includes a variety of paint drying systems configured to dry paint upon a vehicle by blowing pressurized air upon the vehicle. Known prior art does not include a housing containing a heat emitter, wherein the housing is attached to an air hose such that the pressurized air dispensed from the air hose is heated as it passed through the housing and onto the vehicle to decrease the drying time of the paint.

BRIEF SUMMARY OF THE INVENTION

An embodiment of the disclosure meets the needs presented above by generally comprising an air supply configured to supply pressurized air. An air hose is coupled to the air supply and is configured to transfer pressurized air from the air supply through the air hose. A housing is gun-shaped and includes a handle section and a head section. The housing has a channel extending through the housing from the head section to the handle section. The air hose is couplable with the housing, wherein the air hose is in fluid communication with the channel when the air hose is coupled to the housing. A valve is positioned within the channel of the housing and is operated to allow or inhibit passage through the channel. A trigger is operationally coupled to the valve to selectively allow or inhibit passage through the channel by manipulating the trigger. A heat emitter is coupled to the housing and is turned on to emit heat. The heat emitter is positioned within the channel, wherein the heat emitter is configured to heat pressurized air passing through the channel when the heat emitter is turned on. An electricity generator is electrically coupled to the heat emitter. The electricity generator has a driver, and the electricity generator produces electricity when the driver is manipulated by the flow of pressurized air, wherein the heat emitter is turned on when the driver is manipulated.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
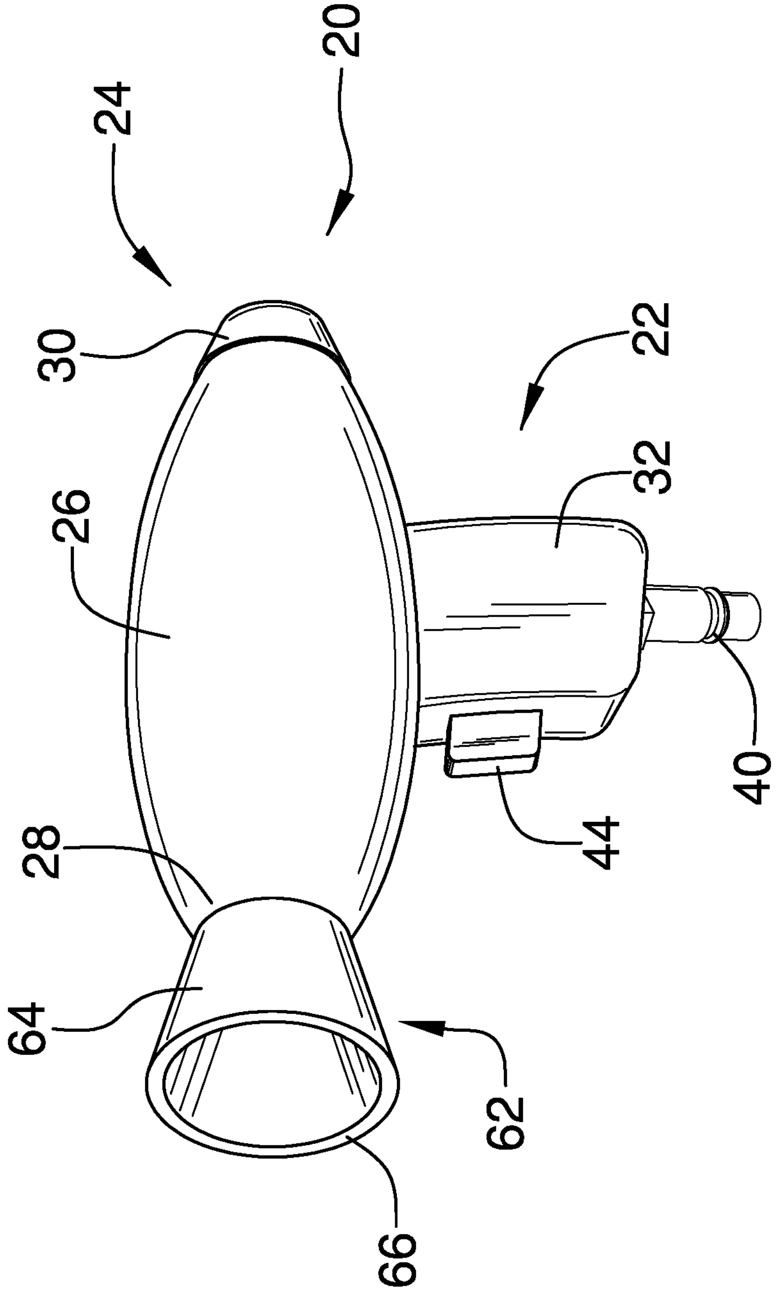
FIG. 1 is a front isometric view of a heated paint drying system according to an embodiment of the disclosure.
Figure 3:
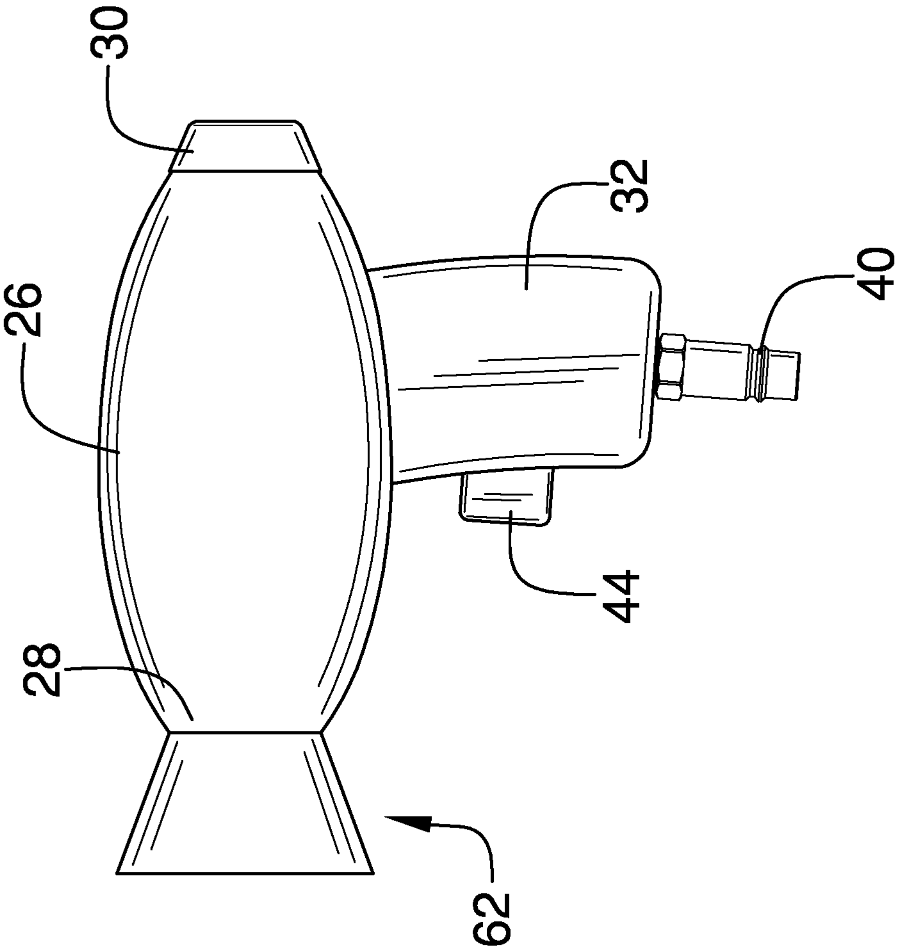
FIG. 3 is a side view of an embodiment of the disclosure.
Figure 2:
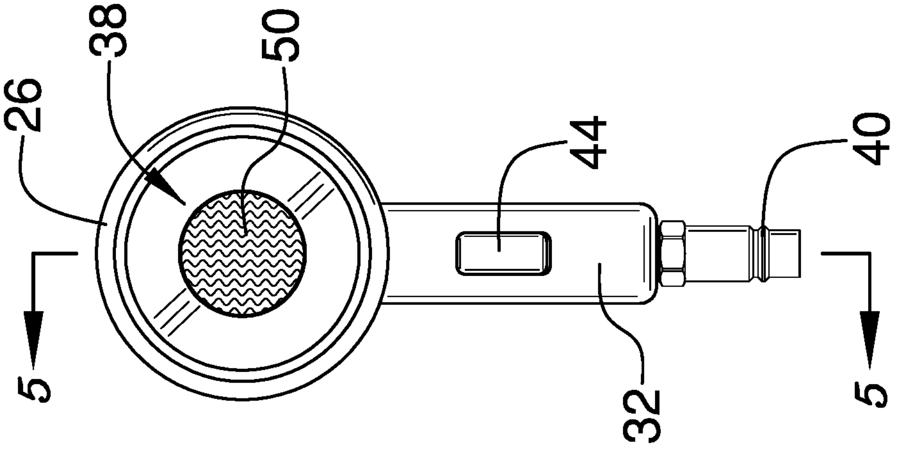
FIG. 2 is a front view of an embodiment of the disclosure.
Figure 4:
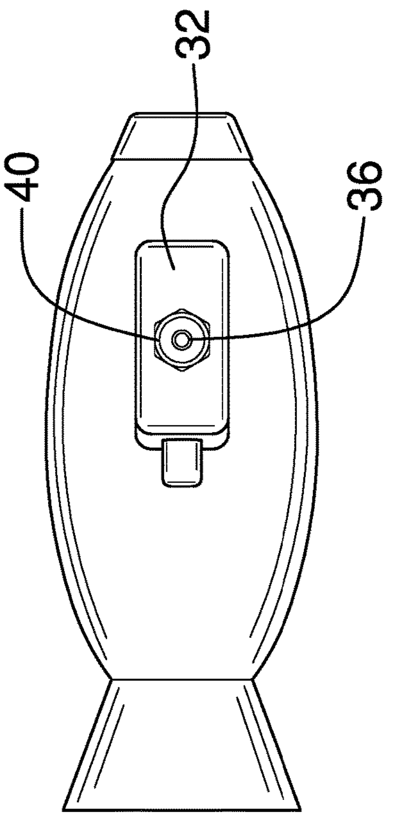
FIG. 4 is a bottom view of an embodiment of the disclosure.
Figure 5:
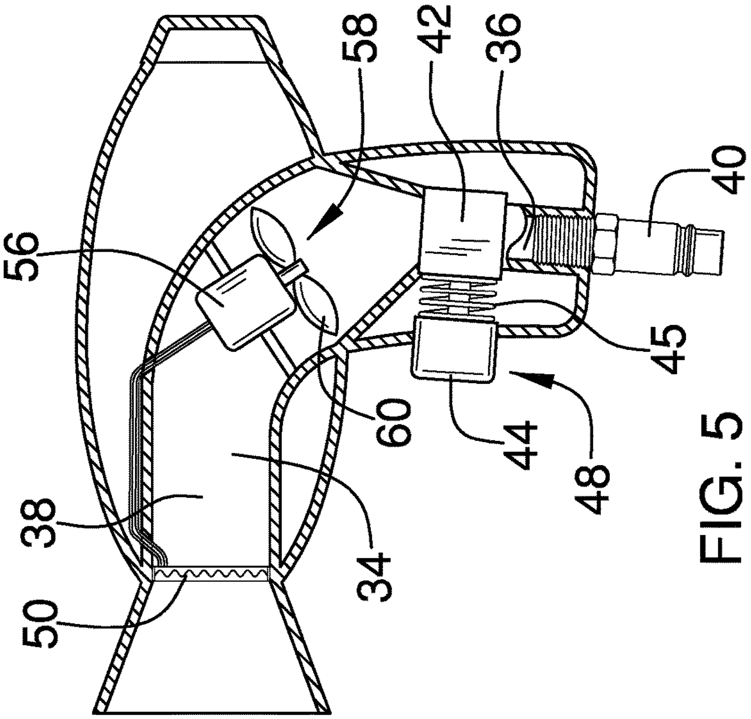
FIG. 5 is a cross-sectional view of an embodiment of the disclosure taken along Line 5-5 of FIG. 2.
Figure 6:
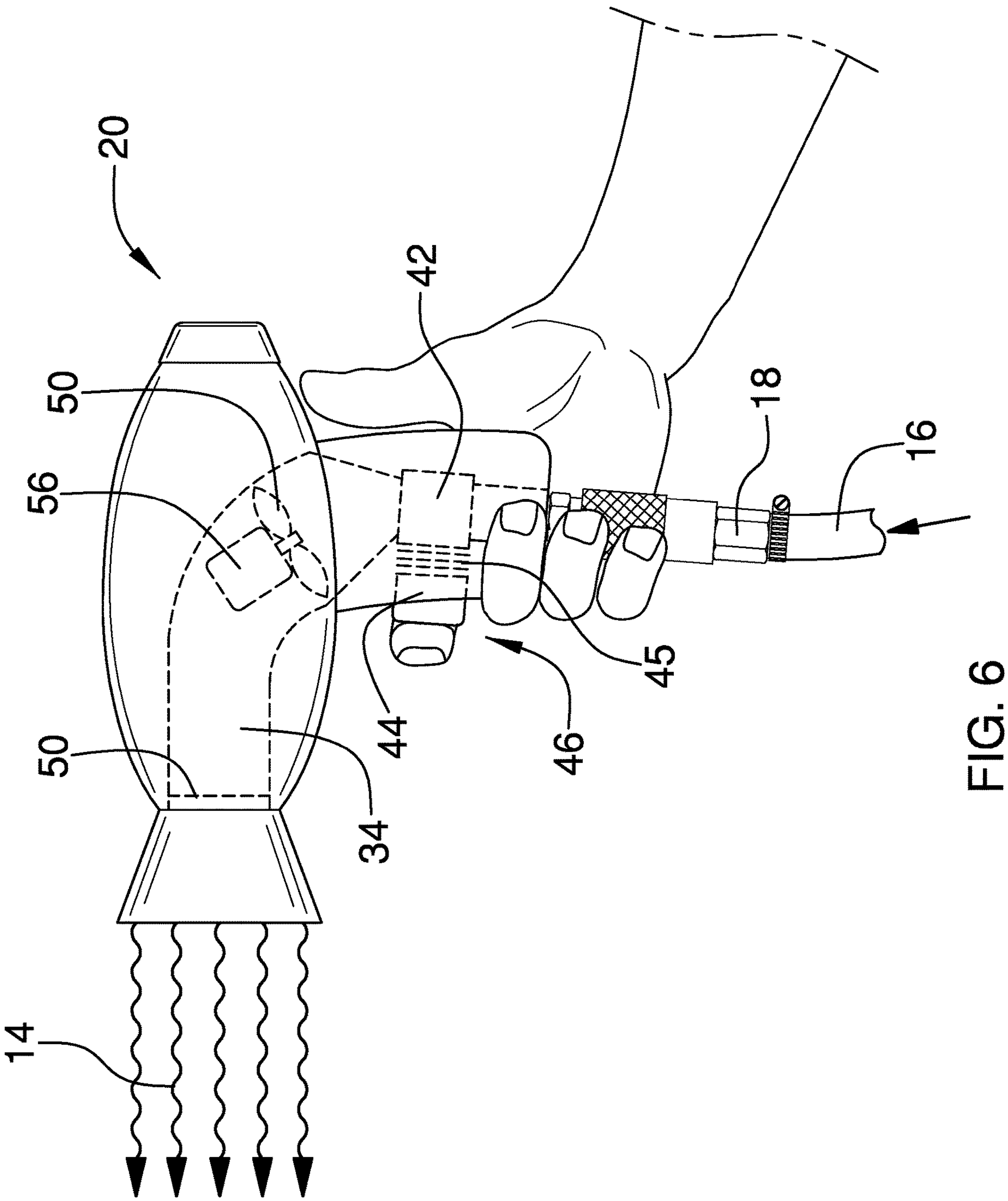
FIG. 6 is an in-use view of an embodiment of the disclosure.
Figure 7:
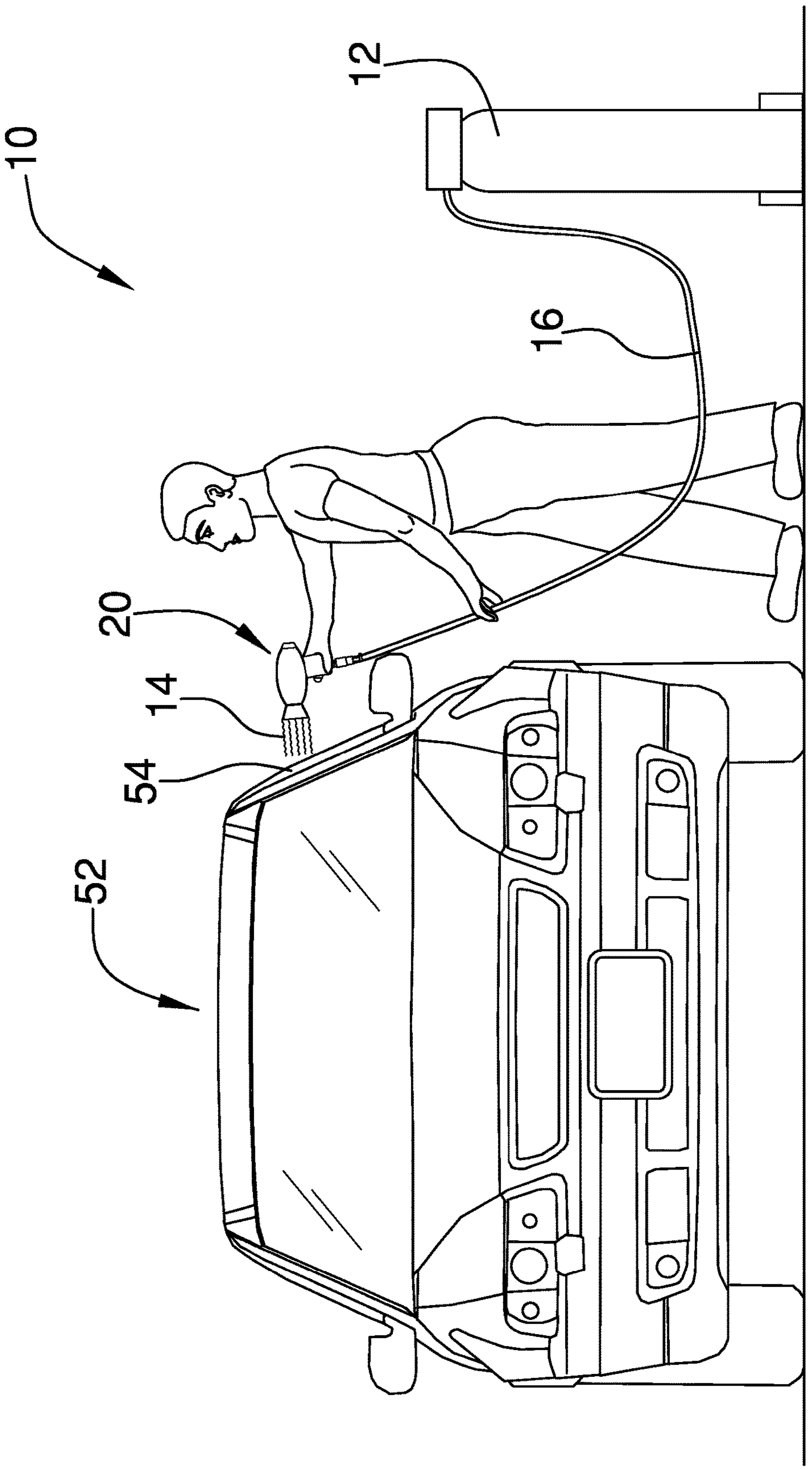
FIG. 7 is an in-use view of an embodiment of the disclosure.

With reference now to the drawings, and in particular to FIGS. 1 through 7 thereof, a new paint drying system embodying the principles and concepts of an embodiment of the disclosure and generally designated by the reference numeral 10 will be described.

As best illustrated in FIGS. 1 through 7, the heated paint drying system 10 generally comprises an air supply 12 configured to supply pressurized air 14. The air supply 12 typically is an air compressor or any other conventional air supply configured to produce and supply pressurized air 14. An air hose 16 is coupled to the air supply 12 and is configured to transfer pressurized air 14 from the air supply 12 through the air hose 16. The air hose 16 extends outwardly from the air supply 12 towards a coupling member 18 of the air hose 16. The coupling member 18 typically is a female quick connect coupler that is typically utilized on conventional air hose 16*s*.

A housing 20 is gun-shaped and includes a handle section 22 and a head section 24. The head section 24 has a perimeter wall 26 elongating from a first end 28 to a second end 30. The first end 28 is open and the second end 30 is closed. An exterior surface of the perimeter wall 26 is convexly arcuate such that the perimeter wall 26 is oval-shaped. The handle section 22 has a projection extending downwardly from the head section 24 to define a grip 32 of the housing 20. A bottom side of the grip 32 has an opening extending through the grip 32 into the housing 20.

The housing 20 has a channel 34 extending through the housing 20 from the head section 24 to the handle section 22. The air hose 16 is couplable with the housing 20, wherein the air hose 16 is in fluid communication with the channel 34 when the air hose 16 is coupled to the housing 20. The channel 34 extends from the opening of the grip 32 to the first end 28 of the perimeter wall 26, wherein the opening defines an inlet 36 of the channel 34 and the first end 28 defines an outlet 38 of the channel 34. A securing member 40 is attached to a peripheral edge of the inlet. The coupling member 18 of the air hose 16 is couplable with the securing member 40 of the inlet 36, wherein the channel 34 is in fluid communication with the air hose 16 when the coupling member 18 is coupled with the securing member 40 of the inlet 36. The securing member 40 is typically a male quick connect coupler such that the male quick connect coupler of securing member 40 corresponds to the female quick connect coupler of the coupling member 18.

A valve 42 is positioned within the channel 34 of the housing 20 and is operated to allow or inhibit passage through the channel 34. The valve 42 is positioned proximate to the inlet 36 of the channel 34. A trigger 44 is operationally coupled to the valve 42 to selectively allow or inhibit passage through the channel 34 by manipulating the trigger 44. The trigger 44 is retractably extendable into the grip 32 of the housing 20 by an extending member 45. The extending member 45 is a compression spring positioned between a body of the trigger 44 and the valve 42. The trigger 44 is extendable from an engaged position 46 wherein the body of the trigger 44 is positioned within the grip 32 to a disengaged position 48 wherein the body of the trigger 44 is positioned outside of the grip 32. The engaged position 46 of the trigger 44 operates the valve 42 to allow passage through the channel 34, wherein the disengaged position 48 of the trigger 44 operates the valve 42 to inhibit passage through the channel 34.

A heat emitter 50 is coupled to the housing 20 and is turned on to emit heat. The heat emitter 50 is positioned within the channel 34, wherein the heat emitter 50 is configured to heat pressurized air 14 passing through the channel 34 when the heat emitter 50 is turned on. The heated pressurized air 14 is configured to be blown upon a vehicle 52 that has been freshly applied with a water-based paint 54, wherein the heated pressurized air 14 reduces the drying time for the freshly applied water-based paint 54. The heat emitter 50 comprises a plurality of heating coils positioned proximate to the outlet 38 of the channel 34. An electricity generator 56 is electrically coupled to the heat emitter 50. The electricity generator 56 has a driver 58, and the electricity generator 56 produces electricity when the driver 58 is manipulated by the flow of pressurized air 14, wherein the heat emitter 50 is turned on when the driver 58 is manipulated. The driver 58 comprises a shaft rotatably coupled to the electricity generator 56. The shaft has a plurality of blades extending outwardly from the shaft to define a fan 60. The fan 60 is positioned within the channel 34 such that the fan 60 spins when pressurized air 14 passes through the channel 34, wherein the driver 58 is manipulated when pressurized air 14 passes through the channel 34.

A muzzle 62 extends outwardly from the first end 28 of the perimeter wall 26. The muzzle 62 is configured to direct the flow of pressurized air 14 discharged from the outlet 38. The muzzle 62 is conically shaped such that a boundary wall 64 of the muzzle 62 tapers from an outer edge 66 of the boundary wall 64 towards the first end 28 of the perimeter wall 26.

In use, the coupling member 18 of the air hose 16 is coupled to the securing member 40 of the inlet 36. The user positions the muzzle 62 of the first end 28 towards the vehicle 52 that has been freshly applied with the water-based paint 54. The user manipulates the trigger 44 by pushing the trigger 44 inwardly toward the grip 32 from the disengaged position 48 to the engaged position 46 to operate the valve 42 to allow passage of pressurized air 14 through the channel 34 of the housing 20. The flow of the pressurized air 14 spins the fan 60 of the electricity generator 56, wherein the heat emitter 50 is turned on and heats the pressurized air 14 within the channel 34. The heated pressurized air 14 is discharged from the muzzle 62 onto the water-based paint 54 upon the vehicle 52, wherein the heated pressurized air 14 reduces the drying time for the freshly applied water-based paint 54.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word “comprising” is used in its non-limiting sense to mean that items following the word are included, but items not specifically mentioned are not excluded. A reference to an element by the indefinite article “a” does not exclude the possibility that more than one of the element is present, unless the context clearly requires that there be only one of the elements.

I claim:

1. A heated paint drying system configured to facilitate drying water-based paint on a vehicle within a spray booth by blowing heated pressurized air upon the vehicle, said heated paint drying system comprising:

an air supply being configured to supply pressurized air;

an air hose being coupled to said air supply, said air hose being configured to transfer pressurized air from said air supply through said air hose;

a housing being gun-shaped, said housing including a handle section and a head section, said housing having a channel extending through said housing from said head section to said handle section, said air hose being couplable with said housing, wherein said air hose is in fluid communication with said channel when said air hose is coupled to said housing;

a valve being positioned within said channel of said housing, said valve being operated to allow or inhibit passage through said channel;

a trigger being operationally coupled to said valve to selectively allow or inhibit passage through said channel by manipulating said trigger;

a heat emitter being coupled to said housing, said heat emitter being turned on to emit heat, said heat emitter being positioned within said channel, wherein said heat emitter is configured to heat pressurized air passing through said channel when said heat emitter is turned on;

an electricity generator being electrically coupled to said heat emitter, said electricity generator having a driver, said electricity generator producing electricity when said driver is manipulated by the flow of pressurized air, wherein said heat emitter is turned on when said driver is manipulated.

2. The heated paint drying system of claim 1, wherein said air hose extends outwardly from said air supply towards a coupling member of said air hose.

3. The heated paint drying system of claim 2, wherein said head section having a perimeter wall, said perimeter wall being elongated from a first end to a second end, said first end being open and said second end being closed, said handle section having a projection extending downwardly from said head section to define a grip of said housing, a bottom side of said grip having an opening extending through said grip into said housing.

4. The heated paint drying system of claim 3, wherein said channel extends from said opening of said grip to said first end of said perimeter wall, wherein said opening defines an inlet of said channel and said first end defines an outlet of said channel, a securing member being attached to a peripheral edge of said inlet, said coupling member of said air hose being couplable with said securing member of said inlet, wherein said channel is in fluid communication with said air hose when said coupling member is coupled to said securing member of said inlet.

5. The heated paint drying system of claim 4, wherein said valve is positioned proximate to said inlet of said channel.

6. The heated paint drying system of claim 4, wherein said heat emitter comprises a plurality of heating coils positioned proximate to said outlet of said channel.

7. The heated paint drying system of claim 3, wherein said trigger is retractably extendable into said grip of said housing by an extending member, said extending member being a compression spring positioned between a body of said trigger and said valve.

8. The heated paint drying system of claim 1, wherein said driver comprises a shaft rotatably coupled to said electricity generator, said shaft having a plurality of blades extending outwardly from said shaft to define a fan, said fan being positioned within said channel such that said fan spins when pressurized air passes through said channel, wherein said driver is manipulated when pressurized air passes through said channel.

9. The heated paint drying system of claim 1, further including a muzzle extending outwardly from said first end of said perimeter wall, said muzzle being configured to direct the flow of pressurized air discharged from said outlet.

10. A heated paint drying system configured to facilitate drying water-based paint on a vehicle within a spray booth by blowing heated pressurized air upon the vehicle, said heated paint drying system comprising:

an air supply being configured to supply pressurized air;

an air hose being coupled to said air supply, said air hose being configured to transfer pressurized air from said air supply through said air hose, said air hose extending outwardly from said air supply towards a coupling member of said air hose;

a housing being gun-shaped, said housing including a handle section and a head section, said head section having a perimeter wall, said perimeter wall being elongated from a first end to a second end, said first end being open and said second end being closed, said handle section having a projection extending downwardly from said head section to define a grip of said housing, a bottom side of said grip having an opening extending through said grip into said housing, said housing having a channel extending through said housing from said head section to said handle section, said air hose being couplable with said housing, wherein said air hose is in fluid communication with said channel when said air hose is coupled to said housing, said channel extending from said opening of said grip to said first end of said perimeter wall, wherein said opening defines an inlet of said channel and said first end defines an outlet of said channel, a securing member being attached to a peripheral edge of said inlet, said coupling member of said air hose being couplable with said securing member of said inlet, wherein said channel is in fluid communication with said air hose when said coupling member is coupled to said securing member of said inlet;

a valve being positioned within said channel of said housing, said valve being operated to allow or inhibit passage through said channel, said valve being positioned proximate to said inlet of said channel;

a trigger being operationally coupled to said valve to selectively allow or inhibit passage through said channel by manipulating said trigger, said trigger being retractably extendable into said grip of said housing by an extending member, said extending member being a compression spring positioned between a body of said trigger and said valve;

a heat emitter being coupled to said housing, said heat emitter being turned on to emit heat, said heat emitter being positioned within said channel, wherein said heat emitter is configured to heat pressurized air passing through said channel when said heat emitter is turned on, said heat emitter comprising a plurality of heating coils positioned proximate to said outlet of said channel;

an electricity generator being electrically coupled to said heat emitter, said electricity generator having a driver, said electricity generator producing electricity when said driver is manipulated by the flow of pressurized air, wherein said heat emitter is turned on when said driver is manipulated, said driver comprising a shaft rotatably coupled to said electricity generator, said shaft having a plurality of blades extending outwardly from said shaft to define a fan, said fan being positioned within said channel such that said fan spins when pressurized air passes through said channel, wherein said driver is manipulated when pressurized air passes through said channel; and a muzzle extending outwardly from said first end of said perimeter wall, said muzzle being configured to direct the flow of pressurized air discharged from said outlet.

* * * * *